United States Patent
Collins et al.

(12) United States Patent
 Collins et al.

(10) Patent No.: US 11,079,033 B2
(45) Date of Patent: Aug. 3, 2021

(54) CHECK VALVE BALL STOP HAVING GASKET COMPRESSION STAND OFF

(71) Applicant: Graco Minnesota Inc., Minneapolis, MN (US)

(72) Inventors: Adam K. Collins, Brooklyn Park, MN (US); Jacob D. Higgins, White Bear Township, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 16/807,396

(22) Filed: Mar. 3, 2020

(65) Prior Publication Data
US 2020/0284369 A1 Sep. 10, 2020

Related U.S. Application Data

(60) Provisional application No. 62/813,872, filed on Mar. 5, 2019.

(51) Int. Cl.
| F16K 27/02 | (2006.01) |
| F16K 15/18 | (2006.01) |
| F16K 15/04 | (2006.01) |
| F16K 15/03 | (2006.01) |

(52) U.S. Cl.
CPC .......... *F16K 27/0209* (2013.01); *F16K 15/04* (2013.01); *F16K 15/183* (2013.01); *F16K 15/185* (2013.01); *F16K 15/03* (2013.01); *F16K 27/0236* (2013.01)

(58) Field of Classification Search
CPC ...... F16K 27/0209; F16K 27/12; F16K 15/04; F16K 15/183

USPC ......................................................... 251/284
See application file for complete search history.

(56) References Cited

U.S. PATENT DOCUMENTS

| 2,914,350 | A | 11/1959 | Smith |
| 3,561,472 | A | 2/1971 | Lamb et al. |
| 3,620,653 | A | 11/1971 | Gaylord et al. |
| 4,646,783 | A | 3/1987 | Bazan et al. |
| 5,232,014 | A | 8/1993 | Hiltebrand |
| 6,619,316 | B2 * | 9/2003 | Wiechers et al. ..... F04B 53/101 137/528 |
| 6,857,638 | B2 | 2/2005 | Dupont et al. |

(Continued)

OTHER PUBLICATIONS

Graco Instructions/Part List for previous model sanitary pump, published Aug. 2018, Entitled "Saniforce High Sanitation Diaphragm Pumps", part No. 312622ZAL

*Primary Examiner* — Kevin L Lee

(57) ABSTRACT

This disclosure concerns a check valve that prevents over compression of a gasket. The check valve comprises a valve housing, a valve cover, and a gasket that seals between the valve housing and the valve cover. A ball fits within the valve housing. The check valve further comprises a ball stop that limits compression of the gasket as the valve cover is tightened with respect to the valve housing. The ball stop serves as a standoff between the valve housing and the valve cover that allows some compression of the gasket as the valve cover is tightened with respect to the valve housing, but at some degree of tightening the incompressible engages both the valve cover and the valve housing to prevent further tightening. Over-compression distorts the gaskets, possibly compromising its sealing function and possibly damaging the gasket.

20 Claims, 7 Drawing Sheets

(56) References Cited

U.S. PATENT DOCUMENTS

| | | |
|---|---|---|
| 8,991,785 B2 | 3/2015 | Sico et al. |
| 2007/0228667 A1 | 10/2007 | Zivi |
| 2012/0139190 A1 | 6/2012 | Doyle |
| 2012/0279700 A1* | 11/2012 | Frazier .................. E21B 33/134 |
| | | 166/193 |
| 2012/0306163 A1 | 12/2012 | Gronauer et al. |
| 2016/0032919 A1* | 2/2016 | Bazan .................... F04B 43/02 |
| | | 417/53 |

* cited by examiner

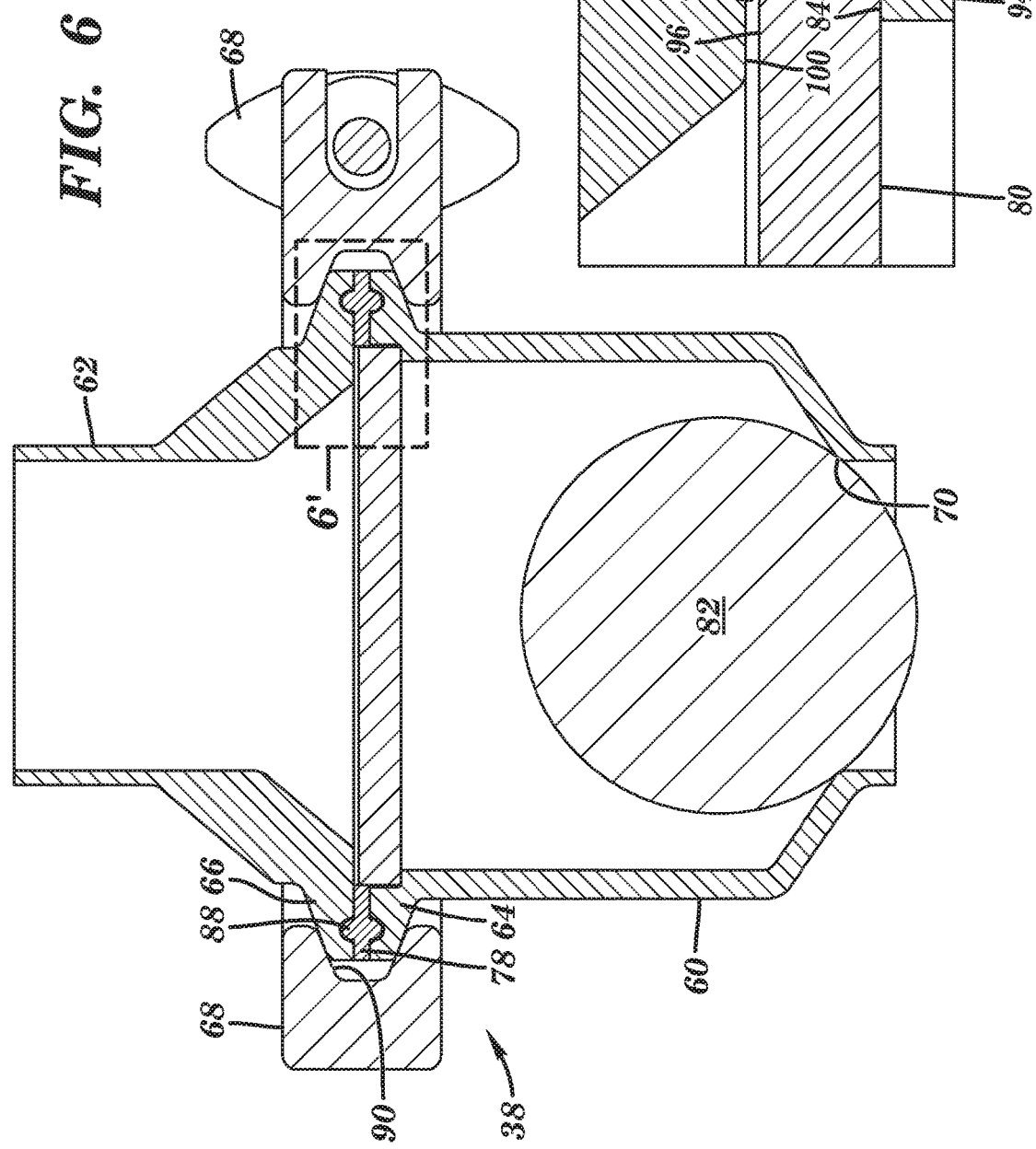

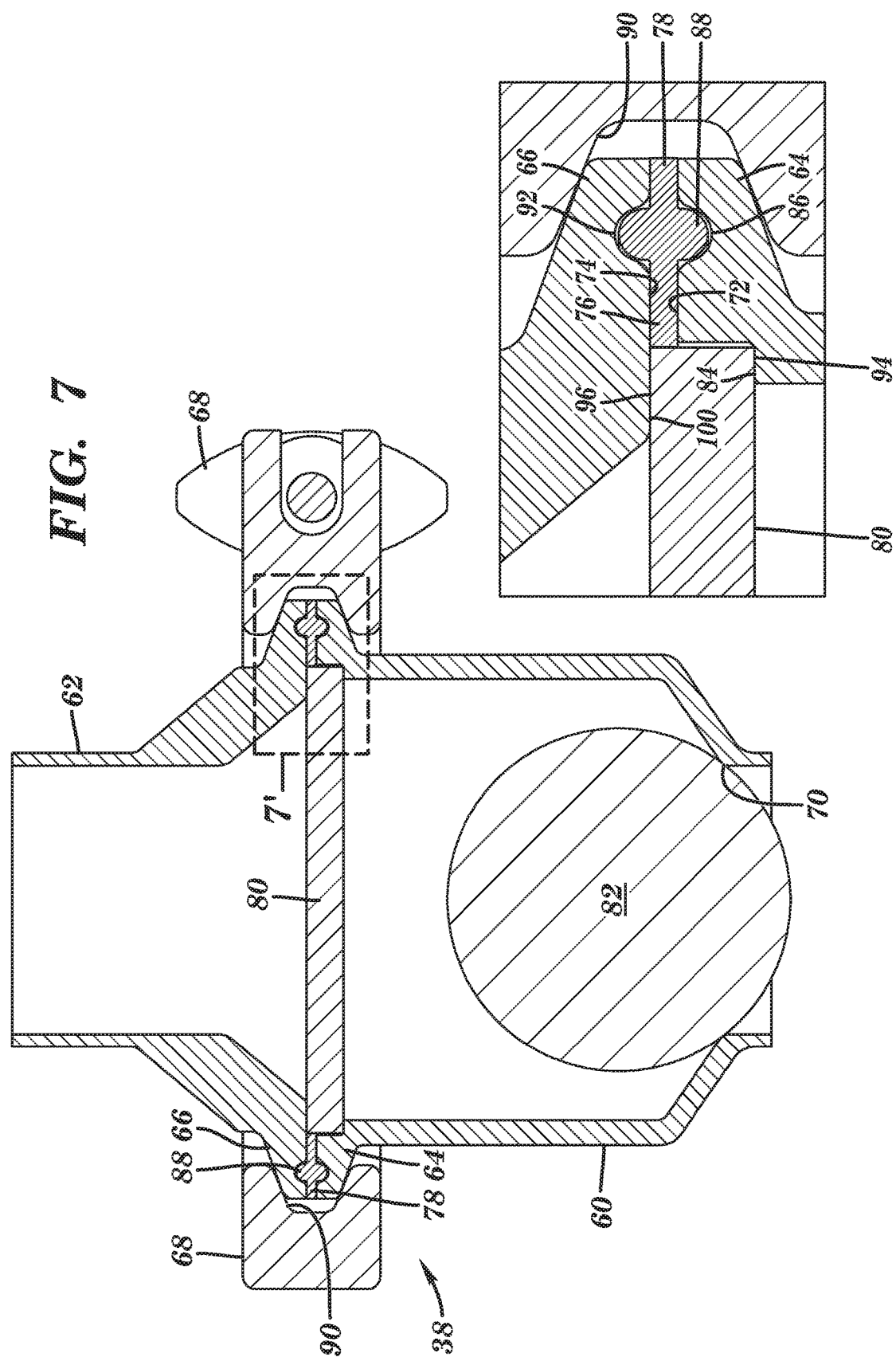

CHECK VALVE BALL STOP HAVING GASKET COMPRESSION STAND OFF

CROSS-REFERENCE TO RELATED APPLICATION

This application claims, under 35 U.S.C. 119 and/or any other relevant law or regulation, the benefit of priority of U.S. Provisional Application No. 62/813,872 filed Mar. 5, 2019, titled "CHECK VALVE BALL STOP HAVING GASKET COMPRESSION STAND OFF", the disclosure of which is hereby incorporated by reference herein in its entirety.

BACKGROUND

Pumps are used to move fluids, particularly liquids. Positive displacement pumps can rely on check valves to regulate the flow of fluids. Some pumps are used for sanitary applications, such as pumping consumable product. Such pumps need regular disassembly and cleaning. There is a need for such pumps to be easy to disassemble and reassemble to minimize maintenance downtime.

SUMMARY

A check valve that prevents over compression of a gasket. The check valve comprises a valve housing, a valve cover, and a gasket that seals between the valve housing and the valve cover. A ball fits within the valve housing. The check valve further comprises a ball stop that limits compression of the gasket as the valve cover is tightened with respect to the valve housing. The ball stop serves as a standoff between the valve housing and the valve cover that allows some compression of the gasket as the valve cover is tightened with respect to the valve housing, but at some degree of tightening the incompressible engages both the valve cover and the valve housing to prevent further tightening. Over-compression distorts the gaskets, possibly compromising its sealing function and possibly damaging the gasket.

BRIEF DESCRIPTION OF THE DRAWINGS

FIG. 6 is a cross sectional view of the check valve assembly in an untightened state, with FIG. 6' being a detailed highlight of FIG. 6.

FIG. 7 is a cross sectional view of the check valve assembly in a tightened state, with FIG. 7' being a detailed highlight of FIG. 7.

DETAILED DESCRIPTION

Figure 1:
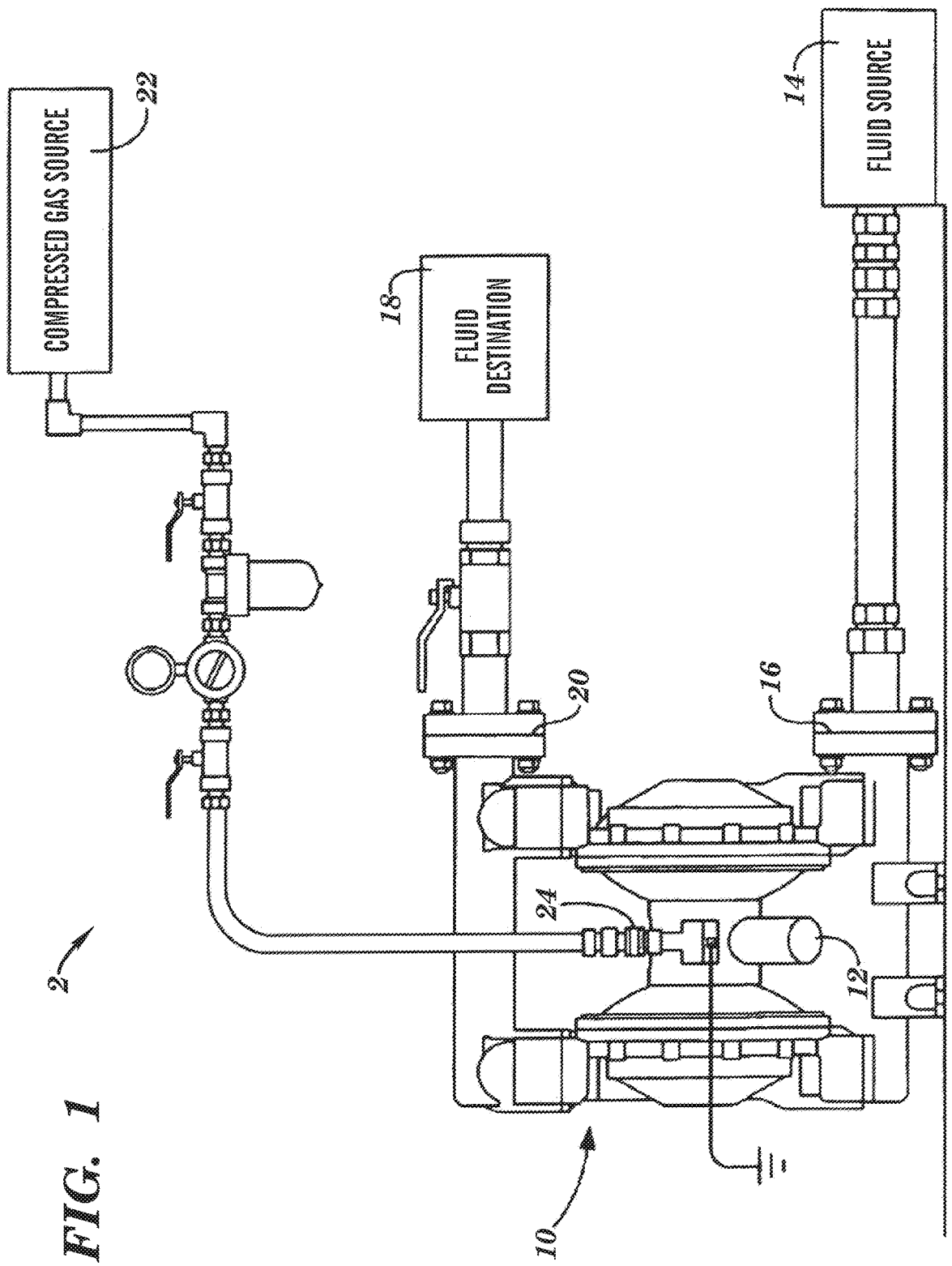
FIG. 1 is a front view of a diaphragm pump system.

FIG. 1 shows a schematic view of a diaphragm pump system 2. Shown in FIG. 1 are pump 10, fluid source 14, fluid inlet 16, fluid destination 18, fluid outlet 20, compressed gas source 22, and pneumatic inlet 24. Pump 10 is connected to fluid source 14 at fluid inlet 16 and to fluid destination 18 at fluid outlet 20. The pump 10 may be used to pump any type of fluid, including gasses, liquids, and solid and/or semi-solid parts suspended in fluid. Pump 10 is also connected to compressed gas source 22 at pneumatic inlet 24, however various embodiments are not limited to being pneumatically driven.

In the illustrated embodiment, the pump 10 is a double diaphragm pump. Thereby, pump 10 uses compressed gas from compressed gas source 22 to pump fluid from fluid source 14 to fluid destination 18. As an alternative to compressed gas, a liquid under pressure (e.g., hydraulic fluid) can instead be used to power pump 10. In some embodiments, pump 10 is driven by an electric or gas motor. For example, pump 10 can be a different type of pneumatic device, such as a pneumatic cylinder. Pump 10 can also be an electric drive, such as a solenoid and/or rotor stator, which drives pump 10.

Figure 2:
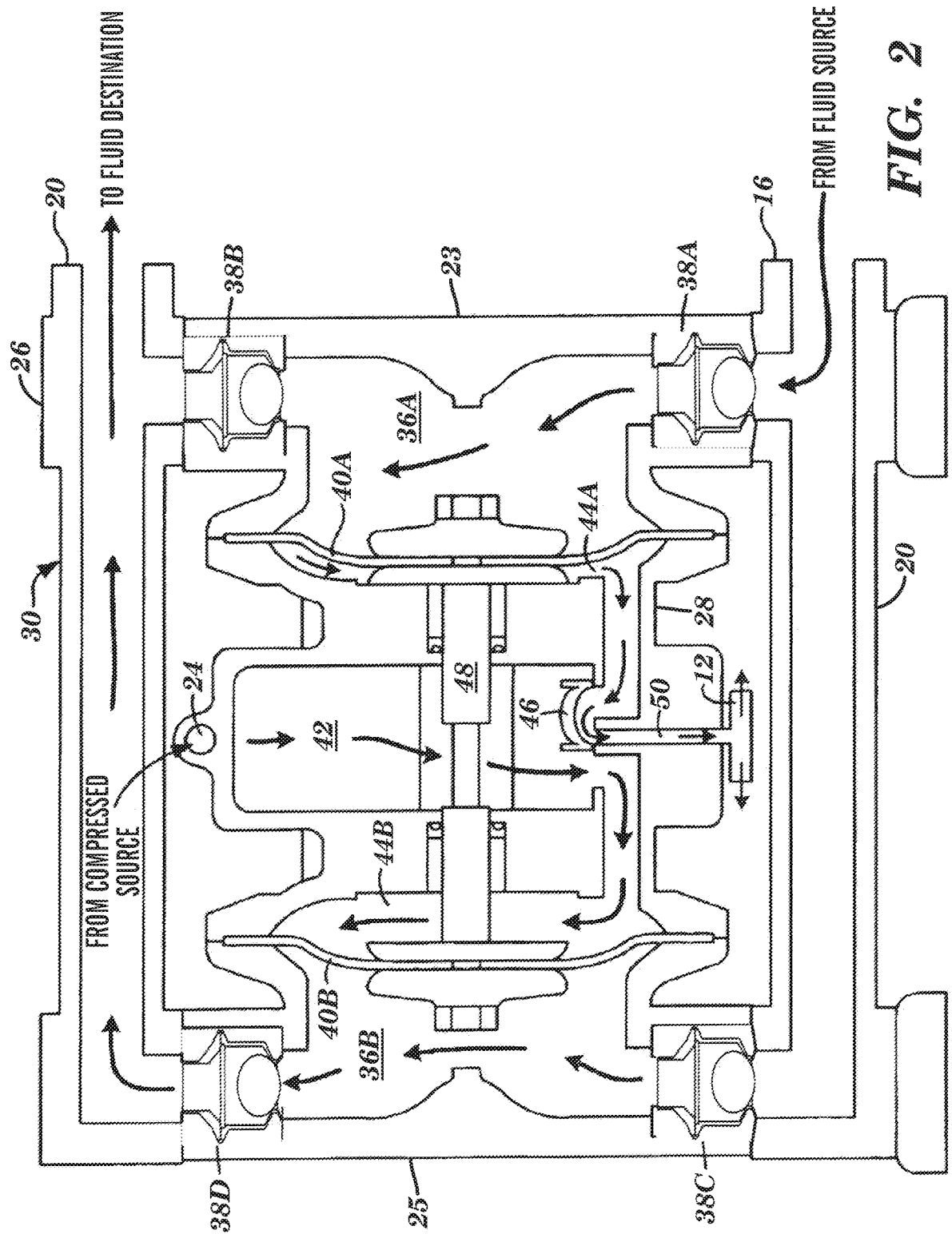
FIG. 2 is a front cross-section view of the diaphragm pump of the diaphragm pump system.

FIG. 2 is a front cross-section view of the pump 10. Shown in FIG. 2 are pump 10, muffler 12, fluid inlet 16, fluid outlet 20, pneumatic inlet 24, body 30, inlet manifold 20, outlet manifold 26, fluid chambers 36A-36B, check valves 38A-38D, diaphragms 40A-40B, gas manifold 42, gas chambers 44A-44B, gas valve 46, piston 48, and pneumatic outlet 50. In some cases, a single diaphragm can be driven instead of dual diaphragms.

Pump 10 has body 30 which forms the basic structure of the pump 10. The body 30 of the pump 10 includes an inlet manifold 20 that is secured, and fluidly connected, to a first cover 23 and a second cover 25. The first cover 23 and the second cover 25 are secured (e.g., via bolts), and fluidly connected, to an outlet manifold 26. The first and second covers 23, 25 attach (e.g., via bolts), and seal, to a center housing 28. The inlet manifold 20, the outlet manifold 26, the first cover 23, the second cover 25, and/or the center housing 28 can be formed from polymer and/or metal. In a preferred embodiment, these body 30 components are formed from stainless steel.

The center housing 28 contains drive components for operating the pump 10. The version of the pump 10 illustrated includes fluid inlet 16, fluid outlet 20, and pneumatic inlet 24. Extending between inlet manifold 20 and outlet manifold 26 are fluid chambers 36A-36B. Fluid chamber 36A is bounded by center housing 28, check valves 38A-38B, and diaphragm 40A. Fluid chamber 36B is bounded by center housing 28, check valves 38C-38D, and diaphragm 40B.

In the illustrated embodiment, the check valves 38A-B are located within the first cover 23. In some cases, check valves 38A-B are secured by the inlet manifold 20 and/or the outlet manifold 26. Likewise, the check valves 38C-D are located within the second cover 25. In some cases, check valves 38C-D are secured by the inlet manifold 20 and/or the outlet manifold 26. In some embodiments, one or more of the check valves 38A-D are not located wholly or partially within another body 30 portion(s), but instead are standalone fluid conduits that attach to the body 30 portions and are partially or wholly exposed externally.

Fluidly connected to pneumatic inlet 24 is gas manifold 42, with gas manifold 42 being fluidly connected to gas chambers 44A-44B. Gas chambers 44A-44B are bounded by body 30 and diaphragms 40A-40B, respectively. Slidably positioned in gas manifold 42, body 30, and gas chambers 44A-44B is piston 48. Piston 48 is connected to diaphragm 40A at one end and to diaphragm 40B at the opposite end. Piston 48 may be driven indirectly or directly by an electric or gas motor in various embodiments.

Slidably positioned in gas manifold 42 near gas chambers 44A-44B is gas valve 46. Gas valve 46 covers pneumatic outlet 50. Fluidly connected to pneumatic outlet 50 and attached to body 30 is muffler 12.

In order to pump fluid from fluid source 14 to fluid destination 18 (both shown in FIG. 1), valve actuator (not shown) moves gas valve 46 side-to-side. As shown in FIG. 2, gas valve 46 is positioned between gas manifold 42 and gas chamber 44A. This causes compressed gas from gas manifold 42 to flow into gas chamber 44B. The compressed gas exerts force on diaphragm 40B, expanding gas chamber 44B and causing diaphragm 40B and piston 48 to move toward fluid chamber 36B. This movement reduces the volume of fluid chamber 36B, forcing fluid contained therein through check valve 38D into outlet manifold 26 (because check valve 38C prevents backflow into inlet manifold 20).

The movement of piston 48 reduces the volume of gas chamber 44A. Because gas valve 46 has fluidly connected gas chamber 44A with pneumatic outlet 50, the compressed gas in gas chamber 44A flows through pneumatic outlet 50, into muffler 12, and out to the atmosphere. The movement of piston 48 also expands fluid chamber 36A, which causes fluid to be drawn up through check valve 38A from inlet manifold 20 (because check valve 38B prevents backflow from outlet manifold 26).

After this first half of the pumping cycle is complete, gas valve 46 will be moved by the valve actuator (not shown) to fluidly connect gas chamber 44B with pneumatic outlet 50. Then the cycle continues with the roles of fluid chambers 36A-36B and gas chambers 44A-44B being reversed, respectively. More specifically, fluid chamber 36A will force fluid into outlet manifold 26 while fluid chamber 36B will draw in fluid from inlet manifold 20. In addition, gas chamber 44A will receive compressed gas from gas manifold 42 while gas chamber 44B will exhaust gas to the atmosphere through muffler 12.

The components and configuration of pump 10 as shown in FIG. 2 allow for compressed gas from compressed gas source 22 (shown in FIG. 1) to be used to pump fluid from fluid source 14 to fluid destination 18 (both shown in FIG. 1). In addition, after the compressed gas is used, it is exhausted to the atmosphere through muffler 12. It will be understood that this is one of several different ways to operate in pneumatic diaphragm pump. It will also be understood that the pump can be hydraulically actuated. In addition to, or independent of, pneumatic or hydraulic actuation, a pump 10 can be operated by an electric drive.

The remainder of this disclosure will discuss check valves 38A-D. In particular, an exemplary check valve 38 will be further shown herein, as all of the check valves 38A-D can be identical. The check valve 38 can be mounted in various ways including in the manner shown in pump 10, but also in other ways.

Figure 3:
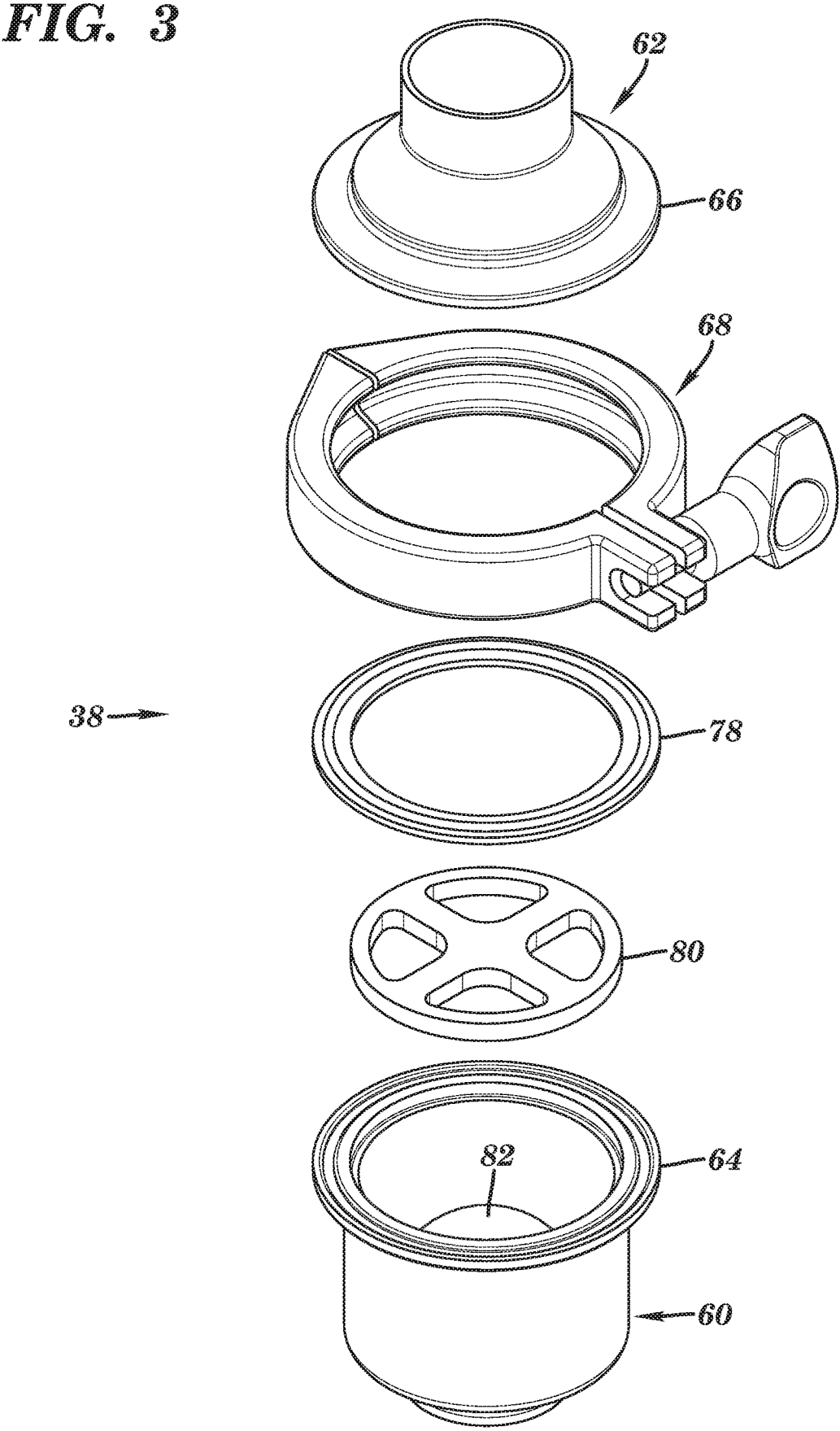
FIG. 3 is an exploded view of a check valve of the diaphragm pump.
Figure 4:
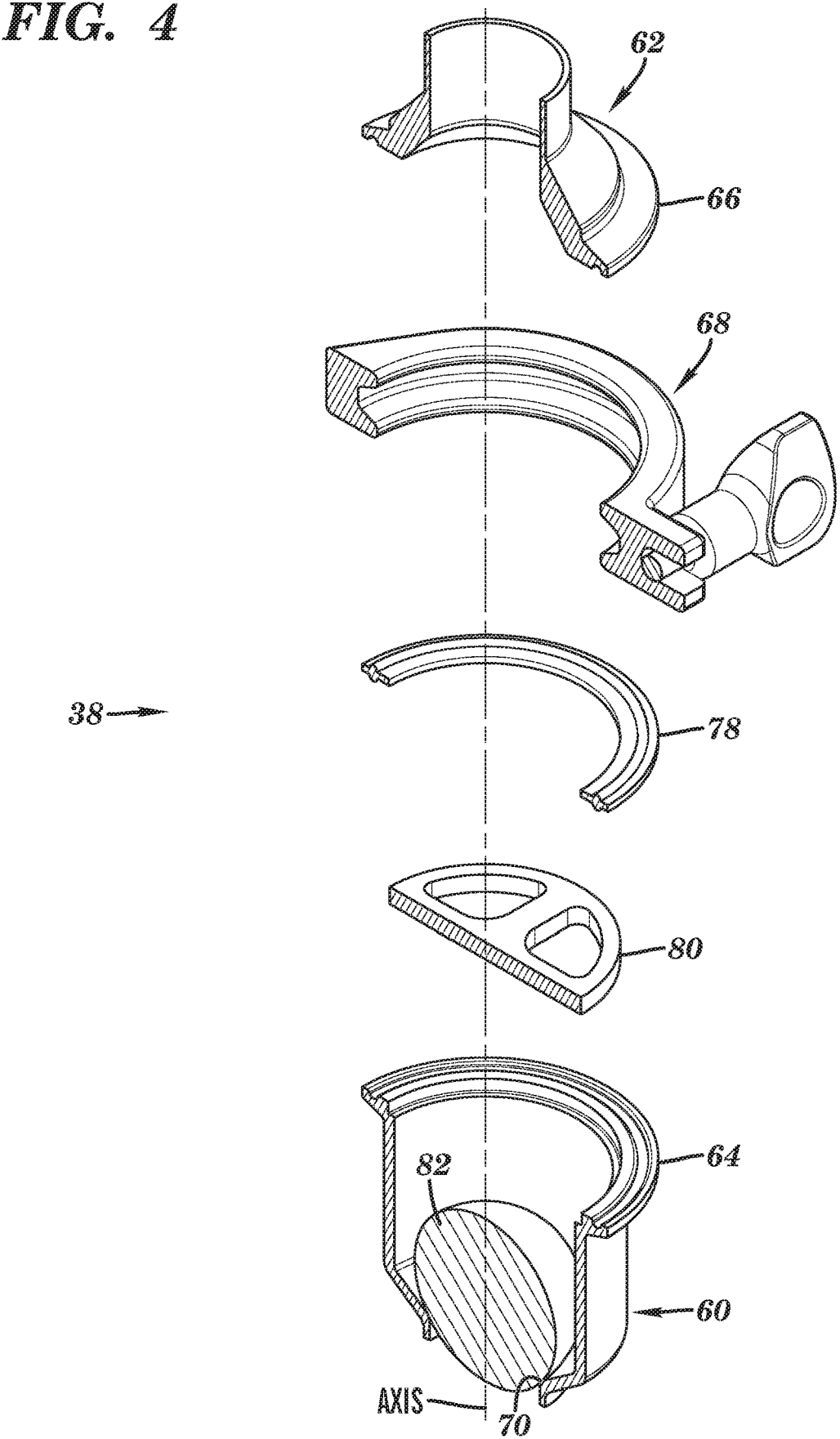
FIG. 4 is an exploded sectional view of the check valve of the diaphragm pump.

FIG. 3 is an exploded view of a check valve 38 of the pump 10. FIG. 4 is an exploded sectional view of the check valve 38, the parts exploded along an axis. The check valve 38 includes a valve cover 62, a clamp 68, a gasket 78, a ball stop 80, a ball 82, and a valve housing 60. An axis is shown in FIG. 4. The check valve 38 is generally aligned along the axis, including when assembled. For example, the valve cover 62, the clamp 68, the gasket 78, the ball stop 80, the ball 82, and the valve housing 60 are all circular and coaxial with respect to the axis, including when assembled. The term "radially" is used herein to refer to direction(s) orthogonal with respect to the axis.

The valve housing 60 can be part of the inlet manifold 20 or the first or second covers 22, 24, amongst other options, depending on whether the check valve 38 is an inlet or outlet check valve and other factors. The valve housing 60 can be an insert that extends into, and/or a piece that connects with, inlet manifold 20 or the first or second covers 22, 24. The valve cover 62 can be part of the outlet manifold 26 or the first or second covers 22, 24, amongst other options, depending on whether the check valve 38 is an inlet or outlet check valve. The valve cover 62 can be an insert that extends into and/or a piece that connects with outlet manifold 26 or the first or second covers 22, 24. Other configurations are possible. For example, the valve housing 60 and/or valve cover 62 may form an independent conduit having end(s) that attach to the manifolds 20, 26 and/or covers 22, 24.

The valve housing 60 includes a flange 64. The valve cover 62 also includes a flange 66. The flanges 64, 66 can be similar in structure, such as having the same outer diameter and/or thickness. When assembled, the gasket 78 fits between the flanges 64, 66. Further, the clamp 68 fits entirely circumferentially around the flanges 64, 66. The clamp 68 can be tightened to push the flanges 64, 66 closer together to further squeeze the gasket 78. The gasket 78 is a ring which annularly seals the interface of the flanges 64, 66 to prevent leakage from the check valve 38.

The clamp 68 can be a sanitary tri clamp, however other types of clamps can be used. The clamp 68 that is illustrated comprises a first arcuate section attached to a second arcuate section by a hinge. The two arcuate sections form a ring. A tightening bolt tightens the ring, progressively decreasing the inner circumference of the annular clamp 68 to tighten around the flanges 64, 66.

The check valve 38 includes a ball 82 within the valve housing 60. Process fluid being pumped flows past the seat 70 (in an upward orientation) to unseat the ball 82 to open the check valve 38. The ball 82 may travel with the fluid flow until it engages the ball stop 80. The ball stop 80 seats in the valve housing 60 in this embodiment, however the ball stop 80 may mount on other components in various other embodiments, such as by mounting in the valve cover 62 in the same manner that it mounts in the valve housing 60. The ball stop 80 in this embodiment includes an outer disc that surrounds a web. In this case, the web is cross shape, but other shapes are possible. For example, while this web is formed from two crossing members, the web could be formed by a single member extending across the outer disc of the ball stop 80 or by three or more crossing members extending across the outer disc of the ball stop 80. The web of the ball stop 80 includes voids between the web members and the outer disc which permit the flow of process fluid being pumped past the ball stop 80 but prevents the ball 82 from traveling past the ball stop 80. Retrograde flow of process fluid pushes the ball 82 against the seat 70 to stop flow past the annular engagement of the ball 82 in the seat 70. The ball stop 80 is disc shaped.

While the seat 70 is formed from the valve housing 60 in this embodiment, the seat 70 could be formed from a separate material, such as metal or ceramic, separate from the valve housing 60. The ball 82 can be formed from rubber, ceramic, polymer, metal, or other material.

Figure 5:
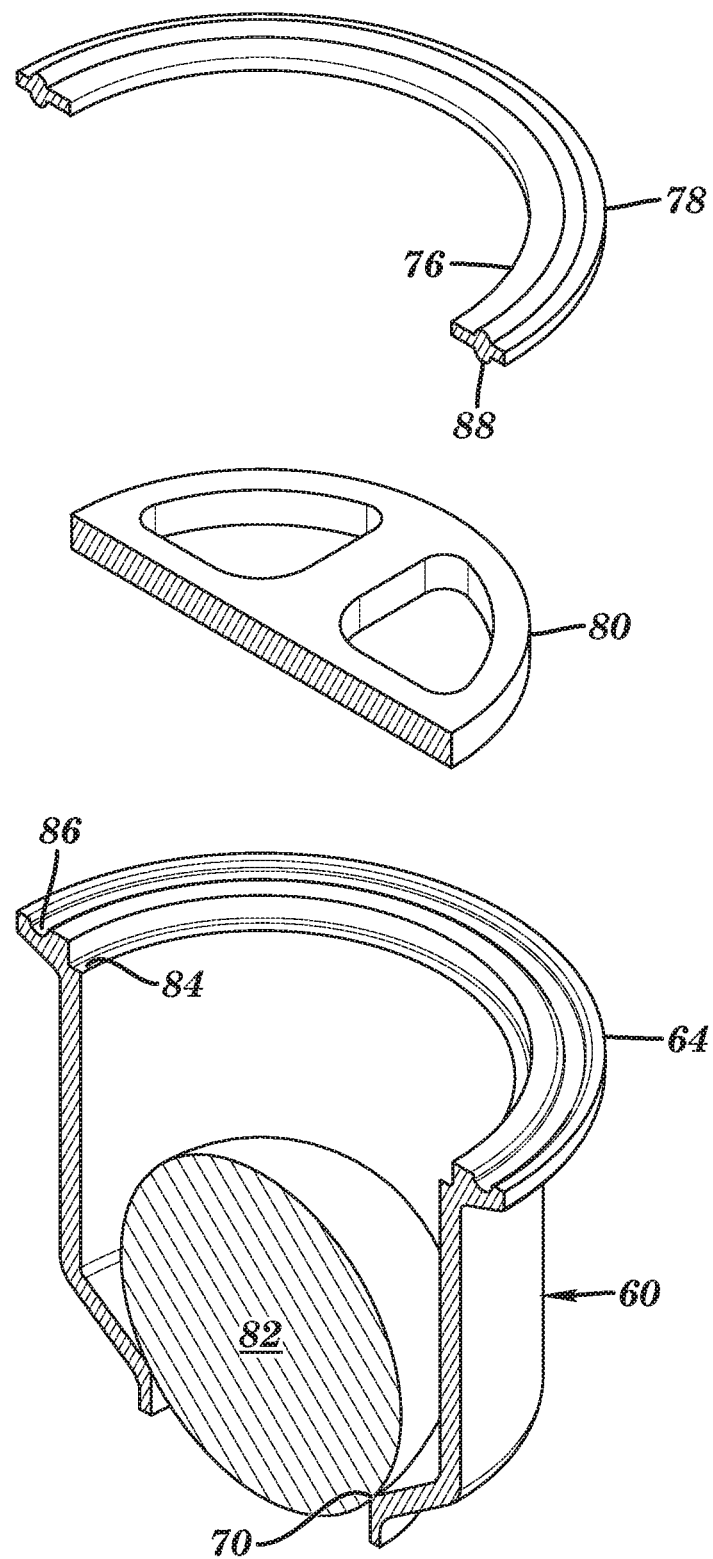
FIG. 5 is a detailed exploded sectional view of a ball assembly and seat of the check valve.

FIG. 5 is a detailed exploded sectional view of a ball assembly and seat of the check valve 38. FIG. 5 shows a ledge 84 formed inside of a main bore of the valve housing 60. The ledge 84 in this embodiment is a socket formed in the main bore of the valve housing 60 for receiving one end of the ball stop 80 within the main bore of the valve housing 60. The ledge 84 defines a section of the main bore of the valve housing 60 having a greater diameter than an adjacent (and longer) section of the main bore of the valve housing 60. The ledge 84 is formed about the entire inner circumference of the inner bore of the valve housing 60. The ledge 84 may be interrupted (limited to discrete sections) in other embodiments and thus not continuous about the inner circumference of the valve housing 64. The outer diameter of the ball stop 80 is slightly less than the diameter of the main bore of the valve housing 60 above the ledge 84 such that the ball stop 80 can fit on the ledge 84 within the valve housing 60 and does not move past the ledge 84. The ball stop 80 is thicker than the ledge 84 is deep so that the ball stop 80 protrudes out from the valve housing 60 when the ball stop 80 rests on the ledge 84. While the ledge 84 is shown as formed in the inner bore of the valve housing 60, the ledge 84 may alternatively be formed in the valve cover 62 in the same manner as it is shown to be formed in the valve housing 60.

FIG. 5 shows a groove 86 formed in the flange 64. The groove 86 is annular and extends entirely around the flange 64. A complementary (e.g., mirrored) groove (shown in FIGS. 6-7) is formed in the flange 66 of the valve cover 62.

As also shown in FIG. 5, the gasket 78 has a disc portion 76. The disc portion 76 is flat. The disc portion can form the inner circumference of the gasket 78 and/or the outer circumference of the gasket 78. The gasket 78 includes a bulge 88 that protrudes from both top and bottom surfaces of the disc portion 76. The gasket 78 is ring-like with no inwardly projecting parts.

FIG. 6 is a cross sectional view of the check valve 38 assembled in an untightened state, with FIG. 6' being a detailed highlight of FIG. 6. As shown, the bottom portion of the bulge 88 fits within the groove 86 of the valve housing 60 while the top portion of the bulge 88 fits within the groove 92 formed in the flange 66 of the valve cover 62. The ring 76 fits between, and separates, the flanges 64, 66. The flanges 64, 66 do not contact one another. Moreover, the valve housing 60 does not contact the valve cover 62. Shown in the detailed view of FIG. 6', the opposing surfaces of the valve housing 60 and the valve cover 62 include flat surfaces 72, 74. The flat surfaces 72, 74 are located on the flanges 64, 66. The flat surfaces 72, 74 are parallel with respect to each other. The flat surfaces 72, 74 are annular. The opposing surfaces of the valve housing 60 and the valve cover 62 further include grooves 86, 92. The grooves 86, 92 are formed in flanges 64, 66. The grooves 86, 92 mirror each other in diameter, circumference, and depth. The profiles of the flanges 64, 66 shown in cross-section in FIG. 6' are the same about the circumferences of the flanges 64, 66. The opposing surfaces of the flanges 64, 66 are complementary to the top and bottom profile of the gasket 78. As shown, the disc portion 76 is flat and parallel with the flat surfaces 72, 74 of the flanges 64, 66. Likewise, the bulge 88 fits within the grooves 86, 92. The gasket 78 evenly separates the flanges 64, 66 about the circumferential interface of the flanges 64, 66 and gasket 78.

As shown in the detailed view of FIG. 6', the clamp 68 includes an angled groove 90. The angled groove 90 includes top and bottom surfaces angled with respect to each other. The top and bottom surfaces can form the profile of a "V" or "U". The top and bottom angled surfaces of the groove 90 annularly interface with the flanges 64, 66. Tightening of the clamp 68 (e.g., by rotating threaded bolt) decreases the circumference of the disc portion of the clamp 68 which circumferentially pushes the angled surfaces of the groove 90 against the flanges 64, 66. Due to the reception of the flanges 64, 66 within the groove 90 and the angling of the surfaces of the groove 90, further tightening of the clamp 68 squeezes the flanges 64, 66 closer together. More specifically, such tightening forces the flat surfaces 72, 74 closer together, squeezing the disc portion 76 of the gasket 78 between the flat surfaces 72, 74. Likewise, such tightening forces the grooves 86 closer together squeezing the bulge 88 of the gasket 78 therebetween.

As shown in the view of FIG. 6, the gasket 78 separates the flanges 64, 66, but with further tightening the gasket 78 becomes further compressed between the flanges 64, 66, because the mechanical advantage generated by the clamp 68 on the flanges 64, 66 can overcome the relatively light stiffness of the flexible gasket 78. It is this tightening and compression of the gasket 78 against the flat surfaces 72, 76 and the grooved surfaces of the flanges 64, 66 that annularly seals the non-contacting interface of the valve cover 62 and the valve housing 60. However, over-tightening risks damaging the gasket 78, which can include extruding of the gasket 78 out from between the flat surfaces 72, 74, which tears the gasket 78 causing seal failure and potential contamination of process fluid. This and other embodiments of this disclosure can prevent over tightening and damage of the gasket 78 by using the ball stop 80 as a travel limit between the valve cover 62 and the valve housing 60.

The detailed view of FIG. 6' shows that the ball stop 80 has a first surface 94 on a first side of the ball stop 80 and a second surface 96 on the second side of the ball stop 80 opposite the first side of the ball stop 80. The first surface 94 engages the ledge 84 to support the ball stop 80 within the valve housing 60. The diameter of the ball stop 80 is greater than the diameter of the ledge 84 securing the ball stop 80 within the socket of the central bore of the valve housing 60, such that the ball stop 80 extends radially beyond and annularly overlaps with the ledge 84. The ball stop 80 is thicker than the depth of the ledge 84 (measured from the flat surface 72) such that ball stop 80 extends out of the central bore of the valve housing 60 and protrudes past the flange 64. In particular, the second surface 96 of the ball stop 80 extends past the flat surface 72, even though the ball stop 80 is circumferentially surrounded by the flat surface 72.

As shown in FIG. 6', a gap 98 exists between the second surface 96 of the ball stop 80 and the valve cover 62. More particularly, a gap 98 exists between the second surface 96 of the ball stop and the flat surface 74. The gap 98 exists because the gasket 78 handles the compression between the flanges 64, 66 generated by the clamp 68 for the state of clamp 68 tightening FIG. 6. However, as the clamp 68 is further tightened and the gasket 78 is further compressed between the flanges 64, 66, the gap 98 narrows until a surface 100 of the valve cover 62 engages the second surface 96 of the ball stop 80 (e.g., the flat surface 74 of the flange 66 engages the second surface 96 of the ball stop 80 in embodiments wherein the flat surface 74 extends over the ledge 84). Such engagement is shown in FIG. 7.

FIG. 7 is a cross sectional view of the check valve 38 similar to that of FIG. 6 but in a tightened state, with FIG. 7' being a detailed highlight of FIG. 7. As shown, the clamp 68 has been tightened to eliminate the gap 98 such that a surface 100 of the valve cover 62 engages a surface (e.g., the second surface 96) of the ball stop 80. More particularly for this embodiment, the flat surface 74 of the flange 66 engages the second surface 96 of the ball stop 80. The ball stop 80 is pinched directly between the ledge 84 and the flange 66, thereby bracing the valve housing 60 and the valve cover 62 and preventing further closing of distance between the flanges 64, 66. The ball stop 80 is formed from non-compressible material such as metal, such that any further tightening of the clamp 68 does not further compressed the ball stop 80, preventing further compression of the gasket 78 beyond closing of the gap 98. Therefore, the ball stop 80 both functions as a stop for travel of the ball 82 and is a compression limit preventing over compression of the gasket 78. If the ball stop 80 did not stop over tightening, then a user assembling the check valve 38 may be uncertain about to what degree to tighten the clamp 68 for proper compression of the gasket 78, whereby over or under tightening can result in leaking of process fluid past the gasket 78 and/or infiltration of contamination. But in this embodiment, the thickness of the ball stop 80, the depth of the ledge 84, and the thickness of the gasket 78 are balanced such that the gasket 78 is ideally compressed at the point at which the ball stop 80 prevents further compression. The user can tighten the clamp 68 until the clamp 68 will not further tightened due to the metal on metal interface of the ball stop 80, the valve housing 60, and the valve cover 62, thereby providing a reliable indication of proper tightness of the clamp 68 and compression of the gasket 78 without risking over tightening. In some cases, the ball stop 80 will allow about 30% compression of the gasket 78. In some cases, the ball stop 80 will allow only less than 40% compression of the gasket 78.

In addition to preventing over tightening while providing a proper amount of gasket 78 compression for sealing, the embodiment secures the ball stop 80 in a metal on metal connection between the valve housing 60 in the valve cover 62 to prevent rattling. Alternatively, a ball stop may not be secured by being pinched directly between clamped metal components, which may be susceptible to rattling which can cause noise, may alarm users, and can lead to premature wear.

As shown in FIG. 7, the gasket 78, and in particular the disc portion 76, radially overlaps with the ball stop 80 (e.g., radially with respect to a longitudinal axis of the check valve 38). Also, the entire inner circumferential surface of the disc portion 76 of the gasket 78 interfaces with the outer circumferential surface of the ball stop 80. The gasket 78 does not axially overlap with the ball stop 80. In other words, the entirety of the gasket 78 is radially outward from the entirety of the ball stop 80. No part of the gasket 76 extends radially inside of the outer circumference of the ball stop 80. The gasket 78 is a separate component than the ball stop 80. The ball stop 80 is a single piece of metal and includes no polymer, rubber, or other molding. The ball stop 80 may last the lifetime of the check valve 38, whereas if the ball stop 80 had rubber sealing components than it would need to be replaced as a wear component. The ball stop 80 is non-directional, such that during assembly of the check valve 38, either side of the ball stop 80 could be up or down (e.g., contacting the ledge 84), thereby minimizing the chance of proper assembly of the check valve 38.

While the main embodiment illustrated herein is a check valve 38 used in a diaphragm pump, the same or different check valve utilizing one or more aspects of the present disclosure may be used in a different type of pump (e.g., a plunger pump) or separate from a pump and/or or a stand-alone check valve.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims. Any single feature, or any combination of features from one embodiment show herein, may be utilized in a different embodiment independent from the other features shown in the embodiment herein. Accordingly, the scope of the invention(s) and any claims thereto are not limited to the particular to the embodiments and/or combinations of the features shown herein, but rather can include any combination of one, two, or more features shown herein.

The invention claimed is:

1. A check valve comprising:
    a valve housing comprising a first annular flat surface and a first annular groove;
    a valve cover comprising a second annular flat surface and a second annular groove, the first annular flat surface opposing the second annular flat surface, the first annular groove opposing the second annular groove;
    a gasket that extends into each of the first annular groove and the second annular groove and that seals between the valve housing and the valve cover;
    a ball that fits within the valve housing; and
    a ball stop comprising a disc that seats in the valve housing such that the disc extends beyond the first annular flat surface toward the second annular flat surface so that the disc engages both of the valve housing and the valve cover to limit compression of the gasket as the valve cover is tightened with respect to the valve housing.

2. The check valve of claim 1, further comprising a clamp that forces the valve cover closer to the valve housing to compress the gasket.

3. The check valve of claim 2, wherein the clamp cannot be further hand tightened once the ball stop engages both of, and is pinched between, the valve cover and the valve housing due to engagement of the disc with both of the valve housing and the valve cover.

4. The check valve of claim 2, wherein the clamp includes a first arcuate portion, a second arcuate portion, a hinge that attaches the first arcuate portion to the second arcuate, and a threaded bolt that tightens the clamp.

5. The check valve of claim 2, wherein the clamp is a sanitary tri-clamp.

6. The check valve of claim 2, wherein the clamp includes a groove formed by angled surfaces, and wherein the groove forces the valve cover closer to the valve housing to compress the gasket as the clamp is tightened.

7. The check valve of claim 6, wherein the valve housing and the valve cover include respective flanges that both interface with the groove of the clamp.

8. The check valve of claim 1, wherein the valve housing and the valve cover include respective flanges.

9. The check valve of claim 8, wherein the gasket is compressed between the flanges.

10. The check valve of claim 1, wherein the first annular flat surface is adjacent to the first annular groove, and the second annular flat surface is adjacent to the second annular groove.

11. The check valve of claim 1, wherein the disc is circular.

12. The check valve of claim 1, wherein the ball stop is made from only metal and does not include any polymer or rubber molding.

13. The check valve of claim 1, wherein the ball stop includes a web within an annular outer disc portion.

14. The check valve of claim 13, wherein the web forms a cross of inwardly projecting members from the annular disc portion.

15. The check valve of claim 1, wherein the ball stop engages a ledge formed in the central bore of either the valve cover or the valve housing.

16. The check valve of claim 15, wherein the ledge is circumferential about the central bore of either the valve cover or the valve housing.

17. The check valve of claim 15, wherein the ledge forms an end of an annular socket in a main bore of either the valve cover or the valve housing, the annular socket receiving the ball stop.

18. A check valve comprising:
a valve housing;
a valve cover;
a gasket that seals between the valve housing and the valve cover;
a ball that fits within the valve housing; and
a ball stop comprising a disc that engages both of the valve cover and the valve housing to limit compression of the gasket as the valve cover is tightened with respect to the valve housing,
wherein the ball stop engages a ledge formed in the central bore of either the valve cover or the valve housing,
wherein the ledge positons the ball stop such that the ball stop extends beyond any part of either the valve cover or the valve housing in which the ledge is formed.

19. A check valve comprising:
a valve housing;
a valve cover;
a gasket that seals between the valve housing and the valve cover;
a ball that fits within the valve housing; and
a ball stop comprising a disc that engages both of the valve cover and the valve housing to limit compression of the gasket as the valve cover is tightened with respect to the valve housing,
wherein:
a ledge is formed in the valve housing,
the ball stop engages the ledge,
the valve housing includes a flange,
the flange includes a flat annular surface that engages the gasket and against which the gasket compresses and seals, and
the ledge positions the ball stop such that the ball stop is circumferentially surrounded by the flat annular surface and the ball stop extends beyond the flat annular surface to engage the valve cover.

20. A check valve comprising:
a valve housing;
a valve cover;
a gasket that seals between the valve housing and the valve cover;
a ball that fits within the valve housing; and
a ball stop comprising a disc that engages both of the valve cover and the valve housing to limit compression of the gasket as the valve cover is tightened with respect to the valve housing,
wherein:
a ledge is formed in the valve cover,
the valve cover includes a flange,
the flange includes a flat annular surface that engages the gasket and against which the gasket compresses and seals, and
the ledge positions the ball stop such that the ball stop is circumferentially surrounded by the flat annular surface and the ball stop extends beyond the flat annular surface to engage the valve housing.

* * * * *